United States Patent
Chow et al.

(10) Patent No.: US 10,311,445 B2
(45) Date of Patent: Jun. 4, 2019

(54) INFERENCE DETECTION ENABLED BY INTERNET ADVERTISING

(75) Inventors: Richard Chow, Sunnyvale, CA (US);
Philippe Jean-Paul Golle, San Francisco, CA (US); Jessica N. Staddon, Redwood City, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 2624 days.

(21) Appl. No.: 12/194,920

(22) Filed: Aug. 20, 2008

(65) Prior Publication Data
US 2010/0049682 A1 Feb. 25, 2010

(51) Int. Cl.
G06Q 30/02 (2012.01)
G06Q 30/06 (2012.01)

(52) U.S. Cl.
CPC ......... *G06Q 30/02* (2013.01); *G06Q 30/0631* (2013.01)

(58) Field of Classification Search
CPC .................................................. G06Q 30/02
USPC ...................................................... 705/14.54
See application file for complete search history.

(56) References Cited

U.S. PATENT DOCUMENTS

| | | | | |
|---|---|---|---|---|
| 2002/0156917 A1* | 10/2002 | Nye | | 709/238 |
| 2004/0167931 A1* | 8/2004 | Han | | 707/104.1 |
| 2007/0156594 A1* | 7/2007 | McGucken | | 705/51 |
| 2007/0282785 A1* | 12/2007 | Fayyad et al. | | 707/1 |
| 2008/0208841 A1* | 8/2008 | Zeng et al. | | 707/5 |
| 2008/0256034 A1* | 10/2008 | Chang et al. | | 707/3 |
| 2008/0270333 A1* | 10/2008 | Jhala et al. | | 706/16 |
| 2009/0048859 A1* | 2/2009 | McCarthy et al. | | 705/1 |
| 2009/0265230 A1* | 10/2009 | Plachouras et al. | | 705/14 |

* cited by examiner

*Primary Examiner* — Daniel M Sorkowitz
(74) *Attorney, Agent, or Firm* — Shun Yao; Park, Vaughan, Fleming & Dowler LLP (57) ABSTRACT

One embodiment of the present invention provides a system that performs inference detection based on Internet advertisements. In doing so, this system first receives a set of topic words, performs a search query on each topic word using a search engine, and gathers a set of Uniform Resource Locators (URLs) associated with sponsored advertisement from the search results corresponding to each search query. Then, the system determines a correlation between two topic words based on their corresponding URLs associated with sponsored advertisement, and produces a result which indicates groups of correlated topic words.

27 Claims, 6 Drawing Sheets

INFERENCE DETECTION ENABLED BY INTERNET ADVERTISING

BACKGROUND

Field of the Invention

The present invention relates to techniques for detecting similar objects. More specifically, the present invention relates to a method and apparatus for performing inference detection based on web advertisements.

Related Art

Information retrieval (IR) is a science of searching for and retrieving information. One specific challenge for information retrieval systems is detecting inference between terms. It is important to advance the methods in order to leverage new information media.

Known inferences between terms can be leveraged in various applications, including Internet search engines and document categorization. For example, known inferences allow a plurality of documents to be categorized even when they do not share exact words or phrasing. In a second example, known similarities between a user's Internet search query and a given web page can facilitate ranking of search results when these results are relevant but not an exact match for the query term.

Much research has focused on developing new methods for measuring inference between terms by using hyperlinks or keyword overlap. However, these existing systems typically detect inference based on a variety of term attributes that are created for independent purposes, and therefore do not guarantee accurate correlation between the objects.

SUMMARY

One embodiment of the present invention provides a system that performs inference detection based on Internet advertisements. In doing so, this system first receives a set of topic words, performs a search query on each topic word using a search engine, and gathers a set of Uniform Resource Locators (URLs) associated with sponsored advertisement from the search results corresponding to each search query. Then, the system determines a correlation between two topic words based on their corresponding URLs associated with sponsored advertisement, and produces a result which indicates groups of correlated topic words.

In a variation on this embodiment, the system determines a correlation between two topic words based on their corresponding URLs associated with sponsored advertisement by generating a bipartite graph based on the topic words and the URLs associated with sponsored advertisement. This bipartite graph includes a first set of vertices associated with one or more topic words, a second set of vertices associated with one or more URLs associated with sponsored advertisement, and a number of edges, wherein a respective edge of the bipartite graph associates a URL for sponsored advertisement with a corresponding topic word. Next, the system generates a first collapsed graph from the bipartite graph by collapsing the vertices associated with the URLs for sponsored advertisement into a number of edges between topic words. The first collapsed graph includes an edge between two topic words if the bipartite graph has edges between the corresponding topic words and an advertisement URL. Then, the system uses the first collapsed graph to cluster topic words into groups that are joined by at least a predetermined number of edges.

In a further variation, the system clusters the URLs associated with sponsored advertisement into groups by generating a second collapsed graph from the bipartite graph. In doing so, the system first collapses the vertices associated with the topic words into a number of edges between URLs associated with sponsored advertisement. The second collapsed graph includes an edge between two URLs associated with sponsored advertisement if the bipartite graph has edges between the corresponding URLs associated with sponsored advertisement and a topic word. Then, the system uses the second collapsed graph to cluster the URLs associated with sponsored advertisement into groups that are joined by at least a predetermined number of edges, and produces a result which indicates the clusters of URLs associated with sponsored advertisement.

In a variation on this embodiment, the system determines a correlation between two topic words based on their corresponding URLs associated with sponsored advertisement by using a similarity metric computation to rank pairs of topic words, and clustering the topic words into groups whose similarity metric computation is greater than or equal to a predetermined value.

In a further variation, the similarity metric is computed based on a Jaccard index or a cosine similarity.

In a variation on this embodiment, the system determines the correlation between two topic words based on their corresponding URLs associated with sponsored advertisement by gathering location-based information associated with a respective topic word from the URLs associated with sponsored advertisement, and clustering the topic words into groups that have location-based information in common.

In a further variation, gathering location-based information from the URLs associated with sponsored advertisement involves searching the title of the URL for location-based information associated with the topic word.

In a further variation, gathering location-based information from the URLs associated with sponsored advertisement involves searching for location-based information in a web page referenced by the URL associated with the topic word.

In a further variation, the location-based information includes one or more of: a neighborhood, city, county, state, and a country.

In a further variation, the location-based information includes neighboring cities and neighboring points of interest related to the topic word.

In a variation on this embodiment, a respective topic word corresponds to a product name, and a respective group of topic words is associated with a group of related products.

In a variation on this embodiment, the system filters the set of URLs associated with sponsored advertisement to remove URLs produced by known aggregators.

TABLE 1 illustrates a number of brands for a set of categories, and an average number of sponsored hyperlinks per brand for these categories, in accordance with an embodiment of the present invention.

TABLE 2 illustrates exemplary clothing recommendations in accordance with an embodiment of the present invention.

TABLE 3 illustrates exemplary baby equipment recommendations in accordance with an embodiment of the present invention.

TABLE 4 illustrates exemplary shoe recommendations in accordance with an embodiment of the present invention.

TABLE 5 illustrates exemplary luggage recommendations in accordance with an embodiment of the present invention.

TABLE 6 illustrates a comparison of the Amazon.com product recommendations with recommendations generated by an inference detection system in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Online advertisements associated with one or more topic words are typically created based on the correlation between the advertisement content and the topic words. For example, a furniture retailer may purchase advertisement space associated with the keywords "leather" and "ottoman" with an Internet search engine because it recognizes a strong correlation between these terms and the interests of its target customers.

Embodiments of the present invention provide a system for mining collective advertiser intelligence to detect inference between terms. This system builds on the observation that if Internet searches based on term A and term B independently result in a given sponsored advertisement hyperlink C, then this correlation is an indication of an inference between A and B. In some embodiments, this system can generate commercial product recommendations for a given retailer by detecting similarities between products. Unlike typical recommender systems, the present system can be completely automated, requires no a priori knowledge of a retailer's brands, and uses publicly available data. Hence, embodiments of the present invention do not require a retailer to maintain and mine a large database of private data.

Inference Detection System

Figure 1:
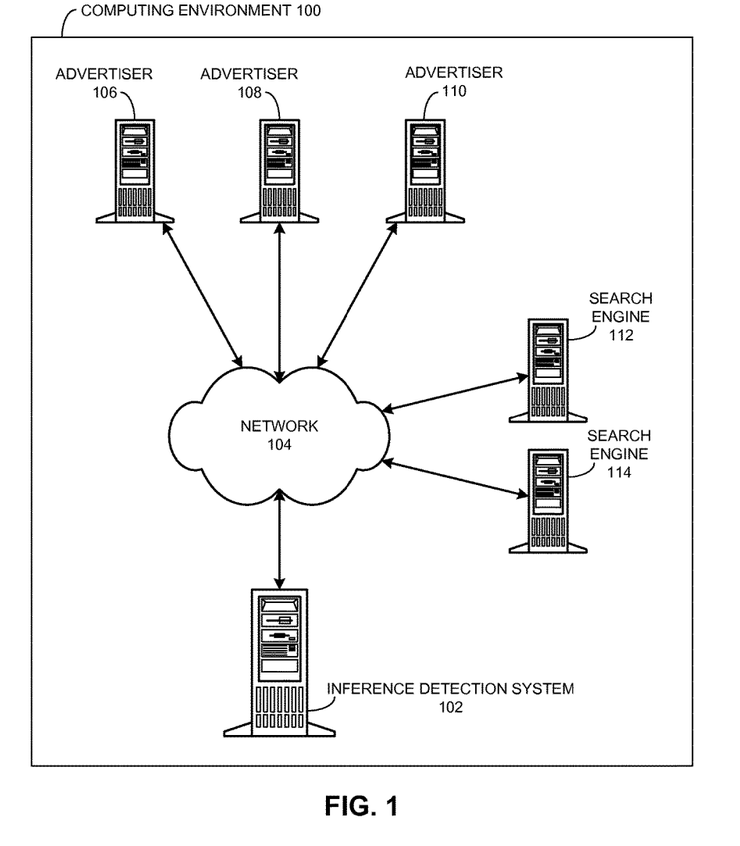
FIG. 1 illustrates an exemplary architecture for a computing environment associated with an inference detection system in accordance with an embodiment of the present invention.

FIG. 1 illustrates an exemplary architecture for a computing environment 100 associated with an inference detection system 102 in accordance with an embodiment of the present invention. Computing environment 100 includes an inference detection system 102, a network 104, a number of advertisers 106-110, and search engines 112-114. Network 104 can include any type of wired or wireless communication channel. In one embodiment of the present invention, network 104 includes the Internet.

Advertisers 106-110 can include any node with computational capability and a communication mechanism for communicating with search engines 112-114 through network 104. Advertisers 106-110 can buy a number of advertising spaces or opportunities (e.g., hyperlinks) associated with searches based on topic words from search engines 112-114. In doing so, advertisers 106-110 can associate a set of topic words with a common hyperlink based on the knowledge of the correlation between the topic words and the advertisement content.

Search engines 112-114 can include any node with computational capability and a communication mechanism for communicating with inference detection system 102 and advertisers 106-110 through network 104. In some embodiments of the present invention, search engines 112-114 include Internet search engines. Search engines 112-114 receive from any of advertisers 106-110 a number of topic words associated with a given hyperlink which links to an online advertisement. Search engines 112-114 use this relationship information to present a set of sponsored hyperlinks when displaying search results corresponding to the search topic word.

Inference detection system 102 can include any node with computational capability and a communication mechanism for communicating with search engines 112-114 through network 104. Inference detection system 102 detects inference between topic words by performing a search query for a respective topic word on one or more of search engines 112-114 to retrieve a corresponding collection of sponsored hyperlinks which are presented with the search results. Inference detection system 102 then uses the mapping between topic words and search query results to group these topic words into clusters or to group the sponsored hyperlinks into clusters.

Figure 2:
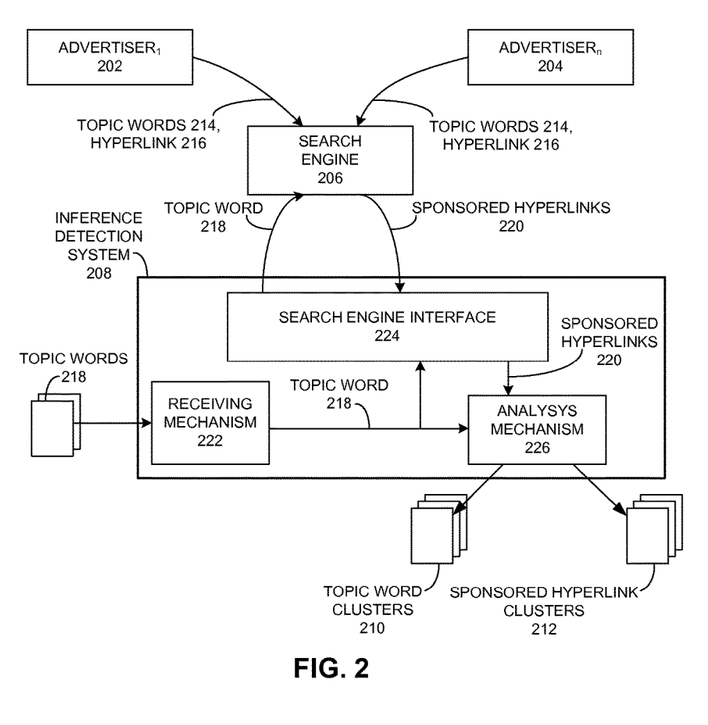
FIG. 2 illustrates a data flow associated with an inference detection system in accordance with an embodiment of the present invention.

FIG. 2 illustrates a data flow associated with an inference detection system 208 in accordance with an embodiment of the present invention. Inference detection system 208 includes a receiving mechanism 222 configured to receive a number of topic words, a search engine interface 224 configured to communicate with a search engine 206, and an analysis mechanism 226 configured to perform inference detection on a set of topic words. Inference detection system 208 uses search engine 206 as a medium for gathering a collective intelligence from a number of advertisers to detect topic-word inference.

At one end of search engine 206, advertisers 202-204 purchase from a search engine 206 the advertising opportunity associated with a number of topic words 214 to present hyperlink 216. In response, search engine 206 registers hyperlink 216 as a sponsored hyperlink 220 which can appear in a search query's result when the search query includes any one of the associated topic words. In essence, advertisers 202-204 provide valuable relationship information for topic words 214 by associating topic words 214 with sponsored hyperlink 220. Note that sponsored hyperlink 220 is associated with a Uniform Resource Locator (URL) that is displayed with a respective online advertisement, and not necessarily with the actual link produced for the online advertisement.

At the opposing end of search engine 206, inference detection system 208 infers relationships between topic words 218 by submitting a search query on a respective search engine 206 for a given topic word 218, and retrieving a corresponding collection of sponsored hyperlinks 220. First, receiving mechanism 222 receives a number of topic words 218. In some embodiments, receiving mechanism 222 can receive topic words 218 from a file and/or a user. Search engine interface 224 performs a search query on a respective topic word 218 using a search engine 206, and gathers a set of sponsored hyperlinks from the search results. Analysis mechanism 226 groups these topic words 218 into topic-word clusters 210 by matching topic words 218 with sponsored hyperlinks 220. In some variations, analysis mechanism 226 groups sponsored hyperlinks 220 into clusters 212 by matching sponsored hyperlinks 220 with topic words 218.

In some embodiments of the present invention, analysis mechanism 226 generates topic word clusters 210 and sponsored hyperlink clusters 212 by performing a graph-based analysis of the relationships between topic words 218 and sponsored hyperlinks 220. This graph-based analysis is illustrated in FIGS. 3A-3D, and is described in the corresponding paragraphs.

Analysis Mechanism

In some embodiments of the present invention, the analysis mechanism performs inference detection on a set of topic words and sponsored hyperlinks by analyzing a directed relationship graph.

Figure 3A:
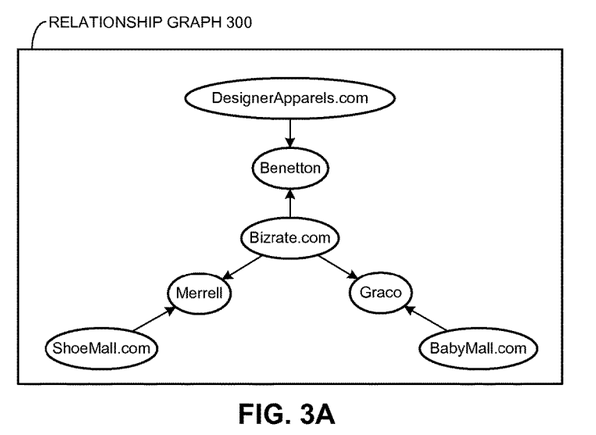
FIG. 3A illustrates an exemplary relationship graph representing associations between topic words and sponsored hyperlinks in accordance with an embodiment of the present invention.

FIG. 3A illustrates an exemplary relationship graph 300 representing associations between topic words and sponsored hyperlinks in accordance with an embodiment of the present invention. In particular, a relationship graph represents inference information by a directed graph including nodes $\{O_i\}_i$ representing topic words and sponsored hyperlinks. Furthermore, a directed edge from $O_i$ to $O_j$ indicates that the advertiser corresponding to the sponsored hyperlink $O_i$ has associated this sponsored hyperlink with topic word $O_j$ (i.e., by purchasing the keywords associated with topic word $O_j$).

Inferences are detected between topic words by analyzing the associations between these topic words based on the sponsored hyperlinks that they have in common. Advertisers may purchase topic words associated with the brands they sell (e.g. the advertiser automall.com buying the keywords "Kia", "Toyota", "Honda", etc.), or the brands of competitors (for example, on May 7, 2008, the search term "Kia" returned a sponsored hyperlink for Toyota (www.ToyotaRetail.com) on Yahoo!).

The example illustrated in FIG. 3A shows an aggregator (e.g., bizrate.com), which has the undesired effect of causing an inference to be detected between largely unrelated brands (e.g., Merrell, Graco, and Benetton). In some embodiments of the present invention, the collection of sponsored hyperlinks is filtered to remove aggregators.

In some embodiments, the relationships between topic words and sponsored hyperlinks are leveraged to make recommendations of brands and/or products. The term "brand" refers to a name that is associated with a collection of goods (e.g. "Toyota"), and the term "product" refers to a specific good (e.g. "Toyota Prius"). For example, TABLE 6 lists products, whereas, TABLES 2-5 list brands. Recommendations are calculated by associating a set of sponsored hyperlinks with each brand (product). For a given brand (product), the other brands (products) are ranked using a similarity measure, thus generating a ranked set of recommendations.

In variations of these embodiments, a similarity metric is used to rank brands (products). A similarity metric is a function that estimates the similarity between two items. In some of these variations, the Jaccard similarity measure (also known as the Jaccard index) is used to rank brands (products). The Jaccard similarity measure calculates the similarities between two sets, A and B, which are subsets of a set C. The Jaccard index of A and B is the ratio of the number of elements that sets A and B have in common, to the number of elements in at least one of A or B:

$$J(A, B) = \frac{|A \cap B|}{|A \cup B|}$$

In other variations, brands (products) are ranked based on a cosine similarity, or a Hamming distance. Details of Jaccard index and cosine similarity can be found at http://en.wikipedia.org/wiki/Jaccard_index, which is incorporated by reference herein.

The following paragraphs present an exemplary application of the inference detection system. This example performs inference detection across a number of brands that span four categories: clothing, baby equipment, shoes, and luggage.

TABLE 1 illustrates a number of brands for a set of categories, and an average number of sponsored hyperlinks per brand for these categories, in accordance with an embodiment of the present invention. For this example, a collection of 350 brands was gathered from online department stores like Nordstrom and Amazon, and includes baby equipment (i.e. cribs, strollers, etc.), shoes, clothes and luggage. To define a ground truth, the brands are grouped into the category that appears to be most closely associated with the brand according to the results of search engine queries on the brands. Most of the brands naturally fall into a single category (e.g. "Graco" in baby equipment and "Ameribag" in luggage). However, there are some cases of brands that branched into multiple categories, for which a category is selected based on the brand's main product line.

TABLE 1

| | Clothing | Baby Equipment | Shoes | Luggage | Total |
|---|---|---|---|---|---|
| Number of Brands | 171 | 99 | 67 | 13 | 350 |
| Average Number of Sponsored Links | 3.2 | 3.6 | 5.1 | 2.9 | 3.65 |

For each brand, a single Internet search query is issued on the brand name, and the resulting sponsored hyperlinks are gathered. Each Internet search query is made through a URL formatted to be unlinked to any user account to prevent sponsored hyperlinks from being overtly biased by user history. For example, a URL for the "Graco" search query on Google is: <http://www.google.com/search?q=graco>.

Next, a filtering operation is performed on the collection of gathered sponsored hyperlinks to excluded known aggregators and department stores (e.g. Shopzilla.com, Shopping.com, Jcpenney.com, Amazon.com, Nordstrom.com). It is important to remove aggregators from the collection of sponsored hyperlinks because they could cause a similarity to be detected between unrelated brands.

The brand names are then associated with the complete URLs of the gathered sponsored hyperlinks, and a similarity metric is calculated to measure inference between two respective brands. In some embodiments of the present invention, the Jaccard index is used as the similarity metric. In other embodiments, inference is measured based on a cosine similarity, or based on a Hamming distance. Using the Jaccard index can be advantageous because a wide variety of brands create a very sparse similarity matrix for which more intuitive measures of similarity (e.g. Hamming distance) can generate results that are less easy to interpret. The Jaccard index, on the other hand, provides a similarity index for any two respective brands. Therefore, to obtain product recommendations around a given brand, the Jaccard index can be used to compute an inference between the given brand and the other brands that it shares sponsored hyperlinks with. After the Jaccard index is computed around a given brand, the recommendations are ranked by their Jaccard index.

The resulting sponsored hyperlinks from this example are sparse, with an average of 0.05 shared sponsored hyperlinks between different products. The average number of sponsored hyperlinks per brand is 3.65 with a maximum of 10 sponsored hyperlinks for the brand, Mountain Buggy. The number of shared sponsored hyperlinks is only slightly higher within a category, indicating that there is not a large overlap among the keywords purchased by advertisers in a given category.

In some embodiments of the present invention, the system performs category matching to evaluate the usefulness of a product recommendation. That is, if a recommendation falls into the same category as the initial brand then it is a good recommendation in some broad sense. Out of the top product recommendations for each brand with a Jaccard index of at least 0.125 (which yields 8 recommendations per product on average), 85% fell in the correct category. For the product recommendations with a Jaccard index of at least 0.2 (which yields 2-3 recommendations per product on average), more than 96% are correctly categorized.

The following paragraphs illustrate information for some of the results obtained from the example. These results span four product categories, namely: clothing, baby equipment, shoes, and luggage.

TABLE 2 illustrates exemplary clothing recommendations in accordance with an embodiment of the present invention. For the 171 clothing brands, the average number of sponsored hyperlinks is 3.2, and the average number of shared hyperlinks between distinct brands is 0.07. The most common incorrect recommendations occurred for luggage brands that include a large line of handbags (e.g. Elliott & Lucca). The maximum number of shared sponsored hyperlinks between distinct clothing brands is 4 (e.g Marc Jacobs and Moschino), but there are only 4 such pairs of brands with such a large overlap. This category had some strongly dominant advertisers. For example, www.designerapparels.com purchased 33 distinct clothing brand names.

TABLE 3 illustrates exemplary baby equipment recommendations in accordance with an embodiment of the present invention. For the 99 baby equipment brands, the average number of sponsored hyperlinks is 3.56, and the average number of shared hyperlinks between distinct brands is 0.07. Miscategorized recommendations are rare for baby equipment, possibly because brands in this group are unlikely to offer products in the other categories. Furthermore, some popular brands were apparent. For example, the brand Zooper had 7 sponsored hyperlinks, and the inference detection system used those hyperlinks to detect similarity with 23 other brands. BabiesRUs.com was the largest advertiser in this category, with ads hyperlinked to 15 different brands in the experimental set of 350 brands.

TABLE 2

| | \multicolumn{7}{c|}{Recommendation for "Bennetton"} |
|---|---|---|---|---|---|---|---|
| | Benetton | Club Monaco | Christian Dior | Pelle Pelle | Bisou-Bisou | Brioni | Elliot & Lucca |
| Jaccard Index | 1 | .5 | .33 | .286 | .25 | .25 | .11 |
| Category | Clothes | Clothes | Clothes | Clothes | Clothes | Clothes | Luggage |
| | \multicolumn{7}{c|}{Recommendation for "Norma Kamali"} |
| | Norma Kamali | Bogner | Nicole Miller | BCBG | Ellesse | | Elliot & Lucca |
| Jaccard Index | 1 | .167 | .167 | .1538 | .133 | | .125 |
| Category | Clothes | Clothes | Clothes | Clothes | Clothes | | Luggage |
| | \multicolumn{7}{c|}{Recommendation for "Sonia Rykiel"} |
| | Sonia Rykiel | Marc Jacobs | Paul Smith | Club Monaco | Moschino | Benetton | Prada |
| Jaccard Index | 1 | .273 | .182 | .167 | .167 | .143 | .083 |
| Category | Clothes | Clothes | Clothes | Clothes | Clothes | Clothes | Luggage |

TABLE 3

| | \multicolumn{6}{c|}{Recommendations for "Maclaren"} |
|---|---|---|---|---|---|---|
| | Maclaren | Child Craft | Inglesina | Banana Fish | Halo EvenFlo | Innovations |
| Jaccard Index | 1 | .182 | .154 | .125 | .111 | .1 |
| Category | Baby | Baby | Baby | Baby | Baby | Baby |
| | \multicolumn{6}{c|}{Recommendations for "Valco"} |
| | Valco | Chicco | Clerk | Inglesina | Baby Jogger | Silvercross Tike Tech |
| Jaccard Index | 1 | .2 | .167 | .167 | .125 | .125 |
| Category | Baby | Baby | Baby | Baby | Baby | Baby |
| | \multicolumn{6}{c|}{Recommendations for "Kettler"} |
| | Kettler | Chico | Inglesina | Baby Jogger | Silvercross Tike Tech | Bumbleride |
| Jaccard Index | 1 | .182 | .167 | .143 | .143 | .133 |
| Category | Baby | Baby | Baby | Baby | Baby | Baby |

TABLE 4 illustrates exemplary shoe recommendations in accordance with an embodiment of the present invention. For the 67 shoe brands, the average number of sponsored hyperlinks is 5.12, and the average number of shared hyperlinks between distinct brands is 0.3. The most common miscategorized recommendations are for clothing and luggage brands, due to the large number of cross-over brands in each category (e.g. bag makers who also produce shoes). This category had the largest number of purchased ads by a single advertiser, as www.zappos.com purchased 39 of the brand names in the collection.

TABLE 4

Recommendations for "Asics"

| | Asics | Seychelles | Ecco | Franco Sarto | Vans | Dr. Martens | Le Tigre |
|---|---|---|---|---|---|---|---|
| Jaccard Index | 1 | .2143 | .2 | .1875 | .182 | .176 | .167 |
| Category | Shoes | Shoes | Shoes | Shoes | Shoes | Shoes | Clothes |

Recommendations for "Camper"

| | Camper | Enzo |
|---|---|---|
| Jaccard Index | 1 | .125 |
| Category | Shoes | Shoes |

Recommendations for "Merrell"

| | Merrell | Easy Spirit | Franco Garmont | Skechers | Life Stride | Dance Now |
|---|---|---|---|---|---|---|
| Jaccard Index | 1 | .143 | .143 | .133 | .125 | .125 |
| Category | Shoes | Shoes | Shoes | Shoes | Shoes | Shoes |

TABLE 5 illustrates exemplary luggage recommendations in accordance with an embodiment of the present invention. For the 13 luggage brands, the average number of sponsored hyperlinks was 2.9, and the average number of shared hyperlinks between distinct brands was 0.07. Due to the small sample size, additional useful statistics could not be inferred.

TABLE 5

Recommendations for "Baggalini"

| | Baggalini | Damiro | A. Saks | Club Monaco |
|---|---|---|---|---|
| Jaccard Index | 1 | .182 | .143 | .11 |
| Category | Luggage | Luggage | Luggage | Clothes |

Recommendations for "Ameribag"

| | Ameribag | Olivier Strelli |
|---|---|---|
| Jaccard Index | 1 | .091 |
| Category | Luggage | Clothes |

Recommendations for "A. Saks"

| | A. Saks | Baggalini | La Baby |
|---|---|---|---|
| Jaccard Index | 1 | .143 | .111 |
| Category | Luggage | Luggage | Baby |

TABLE 6 illustrates a comparison of the Amazon.com product recommendations on May 13, 2008 with recommendations generated by the inference detection system of embodiments of the present invention. Results from the inference detection system indicate that even a large online retailer like Amazon.com may benefit from harvesting collective advertiser intelligence. Amazon provides its customers with product recommendations under a heading, "Customers who viewed this item also viewed." However, for the stroller "BOB Revolution Duallie," Amazon.com does not provide its customers with a wide variety of competing brands of strollers as most are for other BOB strollers. In particular, of the top 11 Amazon.com recommendations, 7 are for BOB strollers. In contrast, the top 11 recommendations using the inference detection system include 7 new (i.e. non-BOB) stroller products. Results from the inference detection system include a wider variety of stroller brands and may be more useful to a consumer, as the consumer is already aware of BOB strollers.

TABLE 6

| Source | Amazon.com | Sponsored Link-based |
|---|---|---|
| 1 | BOB Revolution Duallie 12 | BOB Revolution Duallie |
| 2 | InStep Safari Swivel Double Jogging | BOB Ironman |
| 3 | BOB Revolution Duallie | Baby Jogger City Mini |
| 4 | Schwinn Free Wheeler 2 Double Jogging | Baby Jogger City Elite |
| 5 | BOB Strides Fitnes Duallie | Combi Twin |
| 6 | BOB Sport Utility | Bumbleride Rocket |
| 7 | Baby Jogger City Mini | Peg Perego Aria Twin |
| 8 | BOB Revolution Stroller | Bumbleride Flyer |
| 9 | BOB Revolution Duallie | Chicco Citta Twin |
| 10 | BOB Ironman Sport Utility Duallie | Zooper Tango |
| 11 | Graco Quattro Tour duo | Dreamer Design Ditto Deluxe |

In some embodiments of the present invention, the analysis mechanism of embodiments of the present invention performs inference detection on a set of topic words and sponsored hyperlinks by analyzing a bipartite graph.

Figure 3B:
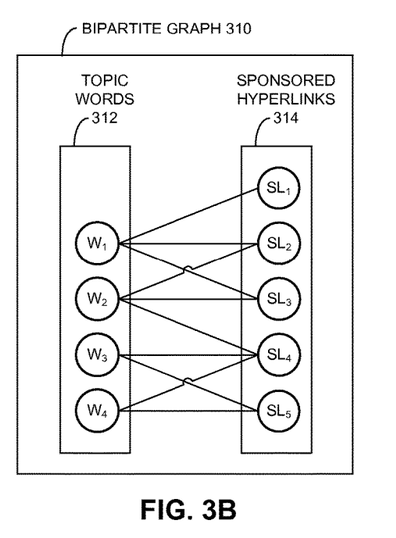
FIG. 3B illustrates a bipartite graph associated with a set of topic words and a corresponding set of sponsored hyperlinks in accordance with an embodiment of the present invention.

FIG. 3B illustrates a bipartite graph 310 associated with a set of topic words 312 and a corresponding set of sponsored hyperlinks 314 in accordance with an embodiment of the present invention. Bipartite graph 310 is used as an intermediate graph in the analysis, which represents the relationship between a set of topic words and a corresponding set of sponsored hyperlinks. Bipartite graph 310 includes two disjoint sets of vertices: a first set of vertices is associated with one or more topic words 312, and a second set of vertices is associated with one or more sponsored hyperlinks 314. The two disjoint sets of vertices are coupled by corresponding edges, where a respective edge associates a sponsored hyperlink with a topic word. By doing so, bipartite graph 310 also associates a respective topic word 312 with a number of sponsored hyperlinks 314.

To perform an inference analysis, the inference detection system can collapse a bipartite graph 310 into two types of collapsed graphs. A first collapsed graph depicts the relationship between topic words, and a second collapsed graph depicts the relationship between sponsored hyperlinks. These two collapsed graphs are illustrated under FIGS. 3C and 3D, respectively.

Figure 3C:
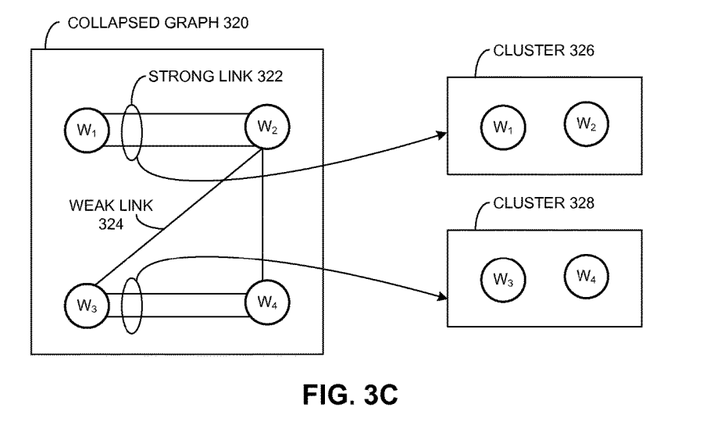
FIG. 3C illustrates a collapsed graph which includes a number of vertices associated with a set of topic words in accordance with an embodiment of the present invention.

FIG. 3C illustrates a collapsed graph 320, which includes a number of vertices associated with a set of topic words 312 in accordance with an embodiment of the present invention. Collapsed graph 320 is constructed by collapsing the sponsored-hyperlink vertices 314 from bipartite graph 310. In doing so, all paths through a respective sponsored-hyperlink vertex are collapsed into a number of edges. For example, collapsing vertex $SL_2$ creates a single edge between vertices $W_1$ and $W_2$ (i.e., $\overline{W_1W_2}$), and collapsing vertex $SL_4$ creates three edges (i.e., $\overline{W_2W_3}$, $\overline{W_2W_4}$, and $\overline{W_3W_4}$).

In some embodiments of the present invention, the inference detection system uses collapsed graph 320 to determine whether two respective topic words are related. In other embodiments, the inference detection system uses the Jaccard index to determine whether two respective topic words are related.

A relationship exists between two topic words when a strong link is detected between the two topic words. In some embodiments, a strong link is said to exist between two topic words when at least a predetermined number of edges couple their corresponding vertices in collapsed graph 320. In other embodiments, a strong link is said to exist between two topic words when their computed Jaccard index is greater than a predetermined value. In other words, a strong link exists between two topic words when the two topic words are categorized into a group by at least a predetermined number of advertisers (i.e., sponsored hyperlinks). For example, collapsed graph 320 includes a strong link 322 formed by two edges, which results from two sponsored hyperlinks (i.e., $SL_2$ and $SL_3$) associating topic words $W_1$ and $W_2$ into the same group.

If less than a predetermined number of links exist to couple the two corresponding vertices in collapsed graph 320, then a weak link is present. For example, collapsed graph 320 includes a weak link 324 formed by a single edge, which results from a single sponsored hyperlink (i.e., $SL_4$) associating topic words $W_2$ and $W_3$ into the same group.

The inference detection system uses strong links in collapsed graph 320 to group key words into clusters. A cluster of topic words is formed by including a number of topic words that are joined together by a set of strong links. For example, cluster 326 is formed based on a strong link that groups topic words $W_1$ and $W_2$ together, and cluster 328 is formed based on a strong link that groups topic words $W_3$ and $W_4$ together.

In some embodiments, the inference detection system only considers sponsored hyperlinks that are representative of a category subject when grouping the key words into clusters. In a variation of these embodiments, the inference detection system performs a filtering process that removes sponsored hyperlinks which correspond to known aggregators. An aggregator is a sponsored hyperlink associated with a set of topic groups which span two or more separate categories.

Any clustering algorithm can be used to partition collapsed graph 320 into a set of clusters. For example, in some embodiments, the system can perform a bottom-up clustering operation which recursively aggregates topic words into clusters. In other embodiments, the system can perform a top-down clustering operation which recursively partitions collapsed graph 320 across weak links to form a number of focused clusters.

Figure 3D:
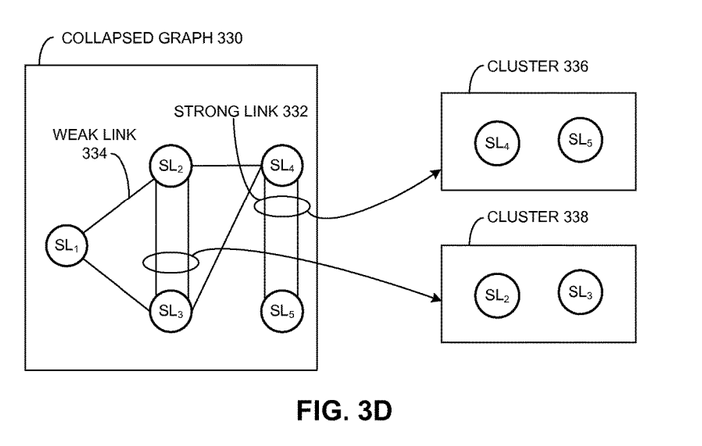
FIG. 3D illustrates a collapsed graph which includes a number of vertices associated with a set of sponsored hyperlinks in accordance with an embodiment of the present invention.

FIG. 3D illustrates a collapsed graph 330 which includes a number of vertices associated with a set of sponsored hyperlinks 314 in accordance with an embodiment of the present invention. Collapsed graph 330 is constructed by collapsing the topic-word vertices 312 from bipartite graph 310. In doing so, all paths through a respective topic-word vertex are collapsed into a number of edges. For example, collapsing vertex $W_3$ from bipartite graph 310 creates a single edge between vertices $SL_4$ and $SL_5$ (i.e., $\overline{SL_4 SL_5}$), and collapsing vertex $W_2$ from bipartite graph 310 creates three edges (i.e., $\overline{SL_2 SL_3}$, $\overline{SL_2 SL_4}$, and $\overline{SL_3 SL_4}$).

The inference detection system uses collapsed graph 330 to determine whether two respective sponsored hyperlinks are related. A relationship exists between two sponsored hyperlinks when a strong link is detected between the two sponsored hyperlinks. In some embodiments, a strong link is said to exist between two sponsored hyperlinks when at least a predetermined number of edges couple their corresponding vertices in collapsed graph 330. In other embodiments, a strong link is said to exist between two sponsored hyperlinks when a computed Jaccard index between the two sponsored hyperlinks is greater than a predetermined value. In other words, a strong link exists between two sponsored hyperlinks when the two sponsored hyperlinks are associated with at least a predetermined number of common topic words. For example, collapsed graph 330 includes a strong link 332 formed by two edges, which results from two topic words (i.e., $W_3$ and $W_4$) associating sponsored hyperlinks $SL_4$ and $SL_5$ into the same group.

If less than a predetermined number of links exist to couple the two corresponding vertices in collapsed graph 330, then a weak link is present. For example, collapsed graph 330 includes a weak link 334 formed by a single edge, which results from a single topic word (i.e., $W_1$) associating sponsored hyperlinks $SL_1$ and $SL_2$ into the same group.

The inference detection system uses strong links in collapsed graph 330 to group sponsored hyperlinks into clusters. A cluster of sponsored hyperlinks is formed by including a number of sponsored hyperlinks that are joined together by a set of topic words. For example, cluster 336 is formed based on a strong link that groups sponsored hyperlinks $SL_4$ and $SL_5$ together, and cluster 338 is formed based on a strong link that groups sponsored hyperlinks $SL_2$ and $SL_3$ together.

Any clustering algorithm can be used to partition collapsed graph 330 into a set of clusters. For example, in some embodiments, the system can perform a bottom-up clustering operation which recursively aggregates sponsored hyperlinks into clusters. In other embodiments, the system can perform a top-down clustering operation which recursively partitions collapsed graph 330 across weak links to form a number of focused clusters.

Figure 4:
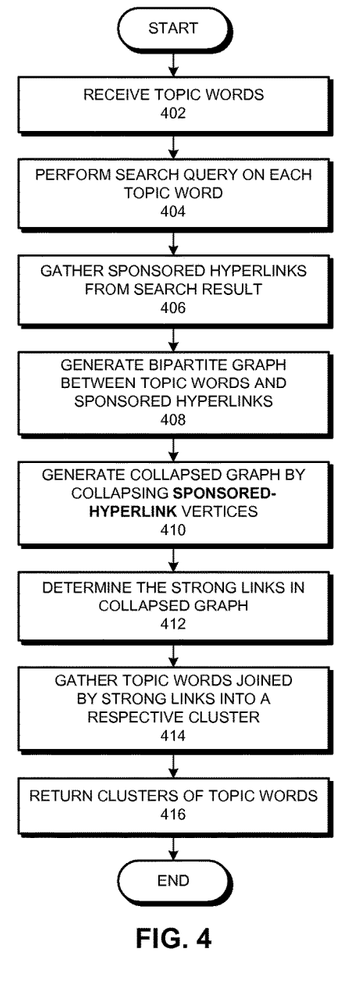
FIG. 4 presents a flowchart illustrating a process for creating a cluster of topic words in accordance with an embodiment of the present invention.

FIG. 4 presents a flowchart illustrating a process for creating a cluster of topic words in accordance with an embodiment of the present invention. During operation, the system first receives a set of topic words (operation 402), and performs a search query for each topic word (operation 404). Next, the system gathers a collection of sponsored hyperlinks from the search results (operation 406), and generates a bipartite graph between the topic words and the sponsored hyperlinks (operation 408). In doing so, the system creates a collection of edges that couple the set of topic words to the set of sponsored hyperlinks, such that a respective edge couples a topic word to a corresponding sponsored hyperlink.

The system then uses the bipartite graph to generate a collapsed graph by collapsing the sponsored-hyperlink vertices of the bipartite graph (operation 410). Once the collapsed graph is generated, the system determines the strong links in the collapsed graph (operation 412), and gathers topic words joined by strong links into a respective cluster (operation 414). Finally, the system returns the clusters of topic words (operation 416).

Figure 5:
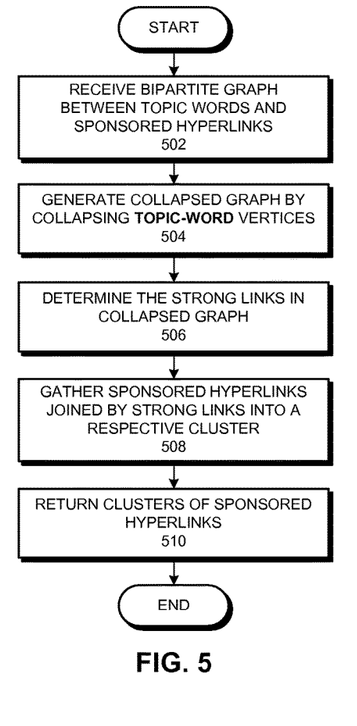
FIG. 5 presents a flowchart illustrating a process for creating a cluster of sponsored hyperlinks in accordance with an embodiment of the present invention.

FIG. 5 presents a flowchart illustrating a process for creating a cluster of sponsored hyperlinks in accordance with an embodiment of the present invention. The system first receives a bipartite graph between topic words and sponsored hyperlinks (operation 502). Next, the system uses the bipartite graph to generate a collapsed graph by collapsing the topic-word vertices of the bipartite graph (operation 504). Once the collapsed graph is generated, the system determines the strong links in the collapsed graph (operation 506), and gathers sponsored hyperlinks joined by strong links into a respective cluster (operation 508). Finally, the system returns the clusters of sponsored hyperlinks (operation 510).

Product-Based Information

In some embodiments, a topic word corresponds to a product name, and a given cluster is associated with a group of related products. In some variations of these embodiments, a product name can include a brand name. The term "brand" refers to a name that is associated with a collection of goods, and the term "product" refers to a specific good.

In these embodiments, the inference detection system can leverage sponsored hyperlinks to establish relationships between products, or to establish relationships between advertisers. For example, inference detection can be applied to a set of topic words associated with a set of products, where the inference detection system creates a product-based bipartite graph that depicts the relationships between a set of products and a corresponding set of advertisers.

Further inference analysis on this bipartite graph can reveal a collection of product clusters, where a respective product cluster depicts a collection of products from related markets, or a collection of products from a common manufacturer. For example, a cluster for the set of product names {"Mountain Buggy", "Kool Stop", "Pepenny"} can be created based on sponsored hyperlinks associated with the baby product industry, such as "strollers.com."

Furthermore, inference analysis on the product-based bipartite graph can reveal a collection of advertiser clusters, where a respective advertiser cluster depicts a collection of corporations that are related by industry. For example, a cluster for the set of sponsored hyperlinks {"zappos.com", "shoemall.com", "piperlime.com"} can be created based on the set of product names from the shoe industry {"Asics", "Naturalizer", "Skechers"}. This inference detection clearly informs that zappos.com, shoemall.com, and piperlime.com are competing vendors in the shoe industry.

Location-Based Information

In some embodiments of the present invention, the inference detection system gathers location-based information associated with a given topic word. In these embodiments, the inference detection system draws an inference between location-based information and a topic word based on the corresponding sponsored hyperlinks from the search query results. For example, inference detection can be applied to a set of topic words associated with a city, a business, a landmark, or any topic associated with a geographical location. The inference detection system can form a bipartite graph that depicts the relationships between a set of topic words and a corresponding set of geographical locations that are identified by the sponsored hyperlink.

In one variation of these embodiments, the inference detection system searches the title of a respective sponsored hyperlink for location-based information associated with the given topic word. In another variation of these embodiments, the system searches for location-based information in a web page referenced by a respective sponsored hyperlink.

Further inference analysis on this bipartite graph can reveal a collection of topic-word clusters, where a respective topic-word cluster includes a collection of topics that are in close proximity to one another. For example, a cluster for the set of topic words {"Golden Gate", "Alcatraz"} can be created based on the set of identified geographical information they have in common {"San Francisco", "Bay Area", "California"}.

Furthermore, inference analysis on the location-based bipartite graph can reveal a collection of geographical location clusters, where a respective geographical location cluster includes a collection of locations that share a common theme or business. For example, a cluster for the set of geographical locations {"California", "Orlando", "Florida"} can be created based on the set of topic words {"Disney", "Theme Park"}. This inference detection clearly informs that California and Florida are two locations for Disney theme parks.

In some embodiments, the location-based information includes one or more of: a neighborhood, city, county, state, and a country. Furthermore, in some embodiments, the location-based information includes neighboring cities and neighboring points of interest related to the given topic word.

Computer System

Figure 6:
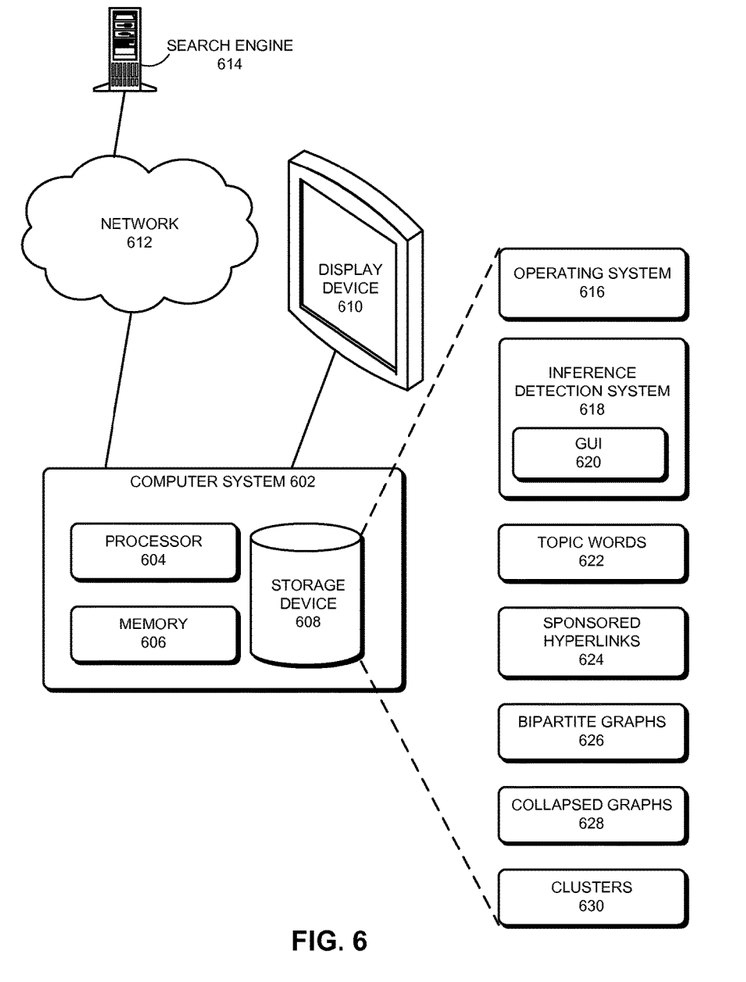
FIG. 6 illustrates an exemplary computer system that facilitates performing inference detection from web advertisements in accordance with an embodiment of the present invention.

FIG. 6 illustrates an exemplary computer system 602 that facilitates performing inference detection from web advertisements in accordance with an embodiment of the present invention. Computer system 602 includes a processor 604, a memory 606, and a storage device 608. Furthermore, computer system 602 is coupled to a network 612 and a display device 610. Also coupled to network 612 is a search engine 614. In one embodiment, network 612 includes the Internet.

Storage device 608 stores an operating system 616, an inference detection system 618, topic words 622, sponsored hyperlinks 624, bipartite graphs 626, collapsed graphs 628, and clusters 630. In one embodiment, inference detection system 618 includes a graphical user interface (GUI) module 620.

During operation, inference detection system 618 is loaded from storage device 608 into memory 606 and executed by processor 604. Inference detection system 618 takes topic words 622 as input, and retrieves sponsored hyperlinks 624 from search engine 614 by performing a search query for topic words 622. Inference detection system 618 uses the relationships between topic words 622 and sponsored hyperlinks 624 to generate bipartite graphs 626 and collapsed graphs 628. Inference detection system 618 uses collapsed graphs 628 to infer relationships between topic words, and to infer relationships between sponsored hyperlinks, and creates clusters 630 which denote the groups of related topic words and the groups of related sponsored hyperlinks.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method, comprising:
receiving, by a computing device, a set of words from an end-user;
for each word in the received set, performing a search query on the word over a computer network using an Internet search engine;
receiving, by the computing device and from the Internet search engine over the computer network, search results corresponding to at least a first word and a second word in the set of words;
identifying a first set of sponsored Uniform Resource Locators (URLs) from a search result corresponding to the first word;
identifying a second set of sponsored URLs from a search result corresponding to the second word;
generating a bipartite graph based on the words and the sponsored URLs identified from the search results of the words, wherein a first set of vertices of the bipartite graph is associated with one or more of the words, wherein a second set of vertices of the bipartite graph is associated with one or more of the sponsored URLs, and wherein a respective edge of the bipartite graph maps a sponsored URL to a word;

generating a first collapsed graph from the bipartite graph by collapsing the vertices associated with the sponsored URLs into a set of edges between words, wherein there exists an edge between two words in the first collapsed graph for a pair of words that are coupled to a common sponsored URL through corresponding edges of the bipartite graph; and responsive to determining that a number of edges coupling the first word and the second word in the first collapsed graph exceeds a predetermined plural threshold, indicating in a result that the first word and the second word are related.

2. The computer-executed method of claim 1, further comprising:

clustering words into groups that are joined by at least a predetermined number of edges in the first collapsed graph.

3. The computer-executed method of claim 2, further comprising clustering the sponsored URLs into groups by:

generating a second collapsed graph from the bipartite graph by collapsing the vertices associated with the words into a number of edges between sponsored URLs, wherein there exists an edge between two sponsored URLs in the second collapsed graph if the bipartite graph has edges between the corresponding sponsored URLs and a word;

clustering the sponsored URLs into groups that are joined by at least a predetermined number of edges in the second collapsed graph; and producing a result which indicates the clusters of sponsored URLs.

4. The computer-executed method of claim 1, further comprising:

using a similarity metric computation to rank pairs of words; and clustering the words into groups whose similarity metric computation is greater than or equal to a predetermined value.

5. The computer-executed method of claim 4, wherein the similarity metric is computed based on a Jaccard index or a cosine similarity.

6. The computer-executed method of claim 1, further comprising:

gathering location-based information associated with a respective word from the sponsored URLs; and clustering the words into groups that have location-based information in common.

7. The computer-executed method of claim 6, wherein gathering location-based information from the sponsored URLs comprises searching the title of the sponsored URLs for location-based information associated with the respective word.

8. The computer-executed method of claim 7, wherein gathering location-based information from the sponsored URLs comprises searching for location-based information in a web page referenced by the sponsored URLs associated with the respective word.

9. The computer-executed method of claim 8, wherein the location-based information includes neighboring cities and neighboring points of interest related to the word.

10. The computer-executed method of claim 1, wherein a respective word corresponds to a product name, and wherein a respective group of words is associated with a group of related products.

11. The computer-executed method of claim 1, further comprising filtering the set of sponsored URLs to remove a URL produced by a known aggregator.

12. A non-transitory computer-readable storage medium storing instructions that when executed by a computer cause the computer to perform a method for performing inference detection from web advertisements, the method comprising:

receiving a set of topic words from an end-user;

for each topic word in the received set, performing a search query on the topic word over a computer network using an Internet search engine;

receiving, by the computing device and from the Internet search engine over the computer network, search results corresponding to at least a first topic word and a second topic word in the set of topic words;

identifying a first set of sponsored advertisement Uniform Resource Locators (URLs) from a search result corresponding to the first topic word;

identifying a second set of sponsored advertisement URLs from a search result corresponding to the second topic word;

generating a bipartite graph based on the topic words and the sponsored advertisement URLs identified from the search results of the topic words, wherein a first set of vertices of the bipartite graph is associated with one or more of the topic words, wherein a second set of vertices of the bipartite graph is associated with one or more sponsored advertisement URLs, and wherein a respective edge of the bipartite graph maps a sponsored advertisement URL to an associated topic word;

generating a first collapsed graph from the bipartite graph by collapsing the vertices associated with the sponsored advertisement URLs into a set of edges between topic words, wherein there exists an edge between two topic words in the first collapsed graph for a pair of topic words that are coupled to a common sponsored advertisement URL through corresponding edges of the bipartite graph; and responsive to determining that a number of edges coupling the first topic word and the second topic word in the first collapsed graph exceeds a predetermined plural threshold, producing a result which indicates the first topic word and the second topic word as being related.

13. The computer-readable storage medium of claim 12, wherein the method further comprises:

clustering topic words into groups that are joined by at least a predetermined number of edges in the first collapsed graph.

14. The computer-readable storage medium of claim 13, wherein the method further comprises clustering the sponsored advertisement URLs into groups by:

generating a second collapsed graph from the bipartite graph by collapsing the vertices associated with the topic words into a number of edges between sponsored advertisement URLs, wherein there exists an edge between two sponsored advertisement URLs in the second collapsed graph if the bipartite graph has edges between the corresponding sponsored advertisement URLs and a topic word;

clustering the sponsored advertisement URLs into groups that are joined by at least a predetermined number of edges in the second collapsed graph; and producing a result which indicates the clusters of sponsored advertisement URLs.

15. The computer-readable storage medium of claim 12, wherein the method further comprises:

gathering location-based information associated with a respective topic word from sponsored advertisement URLs by searching through the title of a respective sponsored advertisement URL or searching through a web page referenced by a respective sponsored advertisement URL; and clustering the topic words into groups that have location-based information in common.

16. The computer-readable storage medium of claim 15, wherein the location-based information includes neighboring cities and neighboring points of interest related to the topic word.

17. The computer-readable storage medium of claim 12, wherein a respective topic word corresponds to a product name, and wherein a respective group of topic words is associated with a group of related products.

18. The computer-readable storage medium of claim 12, wherein the method further comprises filtering the set of sponsored advertisement URLs to remove a URL produced by a known aggregator.

19. An apparatus for performing inference detection from web advertisements, comprising:
 a processor;
 a memory;
 a non-transitory computer-readable storage medium coupled to the processor storing instructions that, when executed by the processor, cause the apparatus to perform a method comprising:
 receiving a set of topic words from an end-user;
 for each topic word in the received set, performing a search query on the topic word over a computer network using an Internet search engine;
 receiving, by the computing device and from the Internet search engine over the computer network, search results corresponding to at least a first topic word and a second topic word in the set of topic words;
 identifying a first set of sponsored advertisement Uniform Resource Locators (URLs) from a search result corresponding to the first topic word;
 identifying a second set of sponsored advertisement URLs from a search result corresponding to the second topic word;
 generating a bipartite graph based on the topic words and the sponsored advertisement URLs identified from the search results of the topic words, wherein a first set of vertices of the bipartite graph is associated with one or more of the topic words, wherein a second set of vertices of the bipartite graph is associated with one or more sponsored advertisement URLs, and wherein a respective edge of the bipartite graph maps a sponsored advertisement URL to an associated topic word;
 generating a first collapsed graph from the bipartite graph by collapsing the vertices associated with the sponsored advertisement URLs into a set of edges between topic words, wherein there exists an edge between two topic words in the first collapsed graph for a pair of topic words that are coupled to a common sponsored advertisement URL through corresponding edges of the bipartite graph; and
 responsive to determining that a number of edges coupling the first topic word and the second topic word in the first collapsed graph exceeds a predetermined plural threshold, producing a result which indicates the first topic word and the second topic word as being related.

20. The apparatus of claim 19, wherein the method further comprises:
 determining one or more strong links in the first collapsed graph; and
 creating clusters of topic words by categorizing the topic words into groups that are joined by strong links in the first collapsed graph.

21. The apparatus of claim 20, wherein the method further comprises clustering the sponsored advertisement URLs into groups by:
 generating a second collapsed graph from the bipartite graph by collapsing the vertices associated with the topic words into a number of edges between sponsored advertisement URLs, wherein there exists an edge between two sponsored advertisement URLs in the second collapsed graph if the bipartite graph has edges between the corresponding sponsored advertisement URLs and a topic word;
 determining one or more strong links in the second collapsed graph;
 clustering the sponsored advertisement URLs into groups that are joined by strong links in the second collapsed graph; and
 producing a result which indicates the clusters of sponsored advertisement URLs.

22. The apparatus of claim 19, wherein the method further comprises:
 using a similarity metric computation to rank pairs of topic words; and
 clustering the topic words into groups whose similarity metric computation is greater than or equal to a predetermined value.

23. The apparatus of claim 19, wherein the method further comprises:
 gathering location-based information associated with a respective topic word from sponsored advertisement URLs by searching through the title of a respective sponsored advertisement URL or searching through a web page referenced by a respective sponsored advertisement URL; and
 clustering the topic words into groups that have location-based information in common.

24. The apparatus of claim 23, wherein the location-based information includes neighboring cities and neighboring points of interest related to the topic word.

25. The apparatus of claim 19, wherein a respective topic word corresponds to a product name, and wherein a respective group of topic words is associated with a group of related products.

26. The apparatus of claim 19, where the method further comprises filtering the set of sponsored advertisement URLs to remove a URL produced by a known aggregator.

27. The method of claim 1, further comprising:
 determining that a user has an interest in a first item, wherein the first item is associated with the first word; and
 recommending a second item to the user, wherein the second item is associated with the second word.

* * * * *